UNITED STATES PATENT OFFICE.

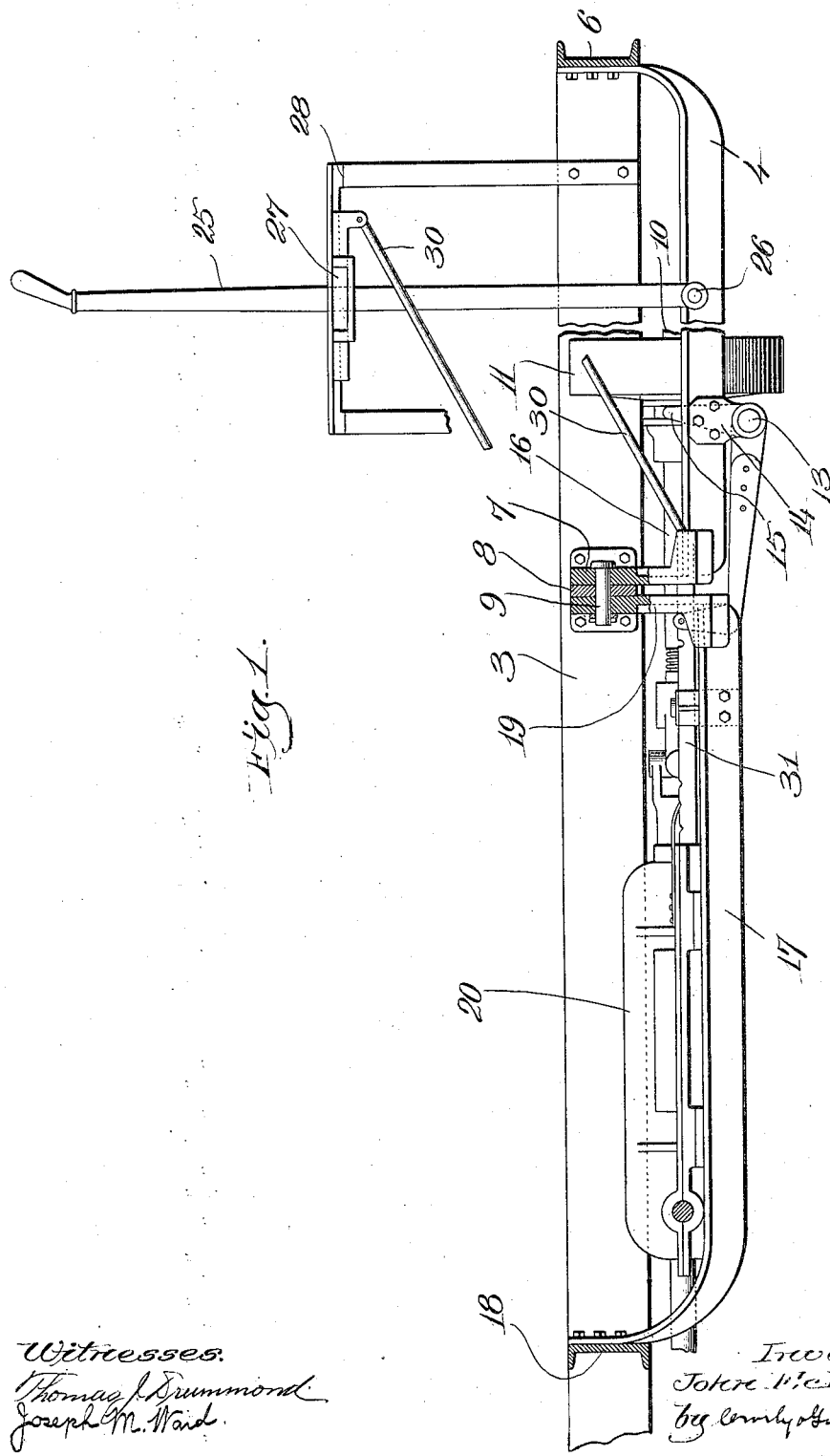

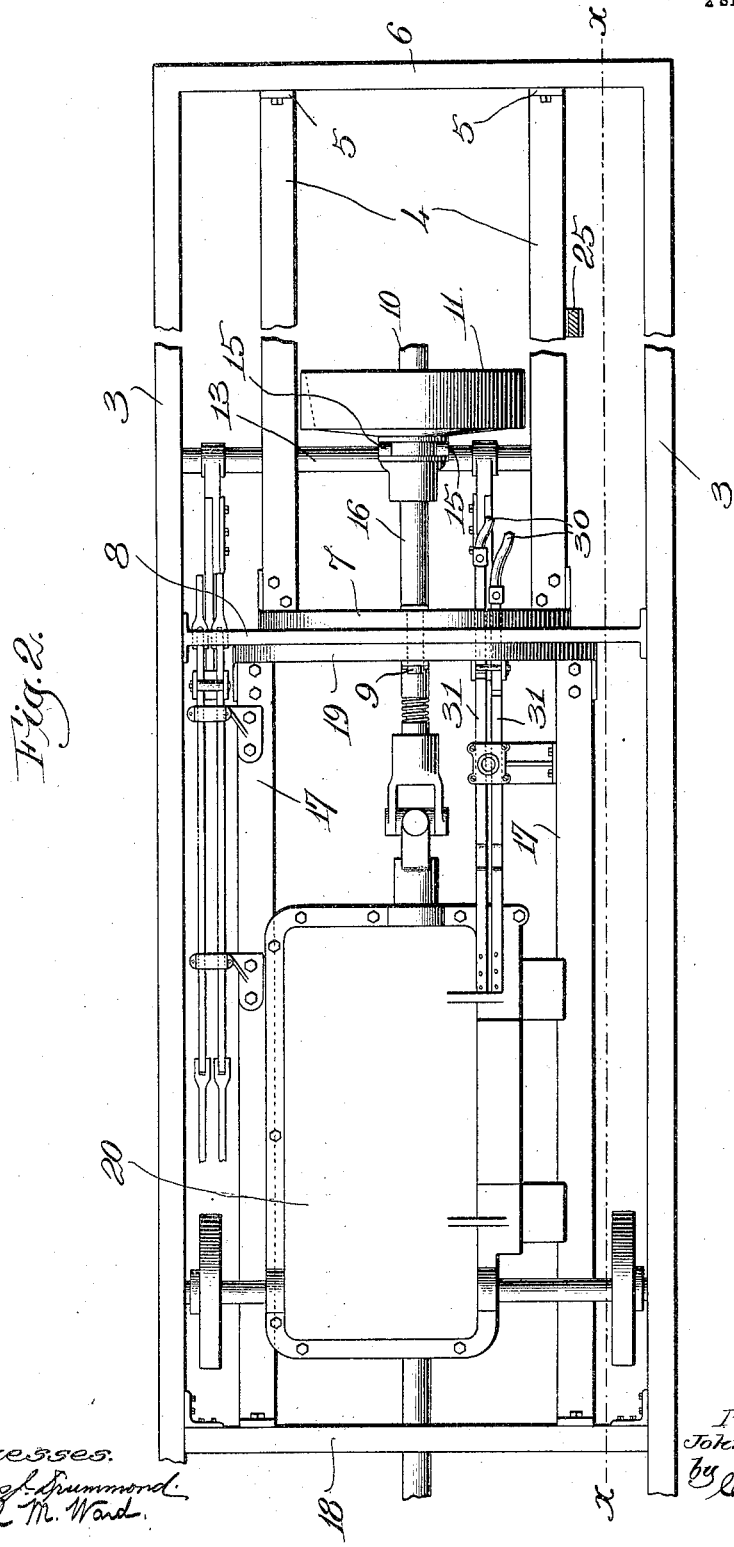

JOHN ECKHARD, OF BOSTON, MASSACHUSETTS.

AUTOMOBILE RUNNING-GEAR.

965,994.   Specification of Letters Patent.   Patented Aug. 2, 1910.

Application filed July 12, 1909. Serial No. 507,081.

*To all whom it may concern:*

Be it known that I, JOHN ECKHARD, a citizen of the United States, residing at Boston, county of Suffolk, State of Massachusetts, and whose post-office address is No. 504 East Fourth street, South Boston, Massachusetts, have invented an Improvement in Automobile Running-Gear, of which the following description, in connection with the accompanying drawing, is a specification, like characters on the drawing representing like parts.

This invention relates to running gear for automobiles and has for its object to provide a novel manner of sustaining the motor and transmission gear so that these parts will not be subjected to any strain due to the twisting of the chassis frame.

I accomplish my object by mounting the motor and the transmission on separate auxiliary frames which are supported in a novel manner so that they can move relatively to the main chassis frame.

I will first describe one embodiment of my invention and then point out the novel features thereof in the appended claims.

In the drawings, Figure 1 is a vertical central section through an automobile frame having my improvements applied thereto; said section being taken on substantially the line $x$—$x$, Fig. 2; Fig. 2 is a plan view of Fig. 1.

The main or chassis frame is shown at 3 and it may have any suitable or usual construction. Where the transmission gear and the motor are both rigidly sustained by the chassis frame, any twisting of the frame, such as inevitably occurs where one of the wheels of the automobile runs over an obstruction, is very liable to put an injurious strain on the motor or transmission gear or both, and it sometimes happens that such strain is sufficient to crack the motor base or to injure the transmission. In my present invention I avoid any such injury by mounting the motor and the transmission on two separate auxiliary frames, (one of which I term the motor-supporting frame, and the other of which I term the transmission-supporting frame) each of which is capable of movement relative to the main chassis frame so that if the chassis frame is subjected to any twisting, the motor-supporting and transmission-supporting frames can adjust themselves to the twist or distortion without putting any injurious strain on any of the parts. The preferred embodiment of my invention is one wherein each of the auxiliary frames is rigidly secured at one end to the main or chassis frame and is pivotally secured at the other end to said frame.

In the present embodiment of my invention the motor-supporting frame comprises two side sills 4, the front end of each of which is rigidly secured to the cross-bar 6 of the chassis frame at 5, and the rear ends of which are secured to a yoke 7 which is pivotally secured to a cross-piece 8 extending between the two side sills of the main frame and forming part thereof. The pivotal connection between the yoke 7 and the cross-piece may be provided for in a variety of ways, and I have herein shown it as comprising a pivotal pin 9 which is sustained in the cross-piece 8 and which extends through the yoke 7. This motor-supporting frame is adapted to support the motor, which has been omitted from the drawings in order to avoid confusion. A portion of the motor shaft, however, is shown at 10, and this is connected to the driving shaft 16 by means of a friction clutch 11 of any suitable or usual construction and which may be actuated by a suitable clutch actuator. The clutch actuator is in the form of a rock-shaft 13 journaled in bearings 14 sustained by the motor-supporting frame, and having the yoke 15 thereon which engages a groove in the hub of one of the clutch members whereby rocking movement of the rock-shaft will disengage the clutch or permit it to be engaged. The driving shaft 16 extends to the transmission gear of any appropriate type that is inclosed in a gear casing 20 that is sustained by the transmission-supporting frame. As stated above, the transmission-supporting frame is also connected to the chassis so that said frame can have a movement relative to the chassis thereby to prevent any injurious strain being put on the transmission gear if the chassis twists slightly. In the preferred embodiment of my invention this auxiliary transmission-supporting frame comprises the two side sills 17 which are connected at their rear ends to the cross sill 18 extending between the two side sills of the chassis frame and which are connected at their front ends to a yoke 19, that in turn is pivotally connected to the chassis. I find it convenient to pivotally connect the yoke 19 to the chassis frame by means of the pivotal pin 9 which is used to pivotally connect the yoke 7 to the chassis. The transmission may have any suitable or usual construction and as it forms no part of my present invention I have not deemed it necessary to show it herein in detail. I have merely shown the gear casing 20 in which the transmission gear is sustained, this gear casing being secured in any appropriate way to the transmission-supporting frame. This manner of connecting the motor-supporting and transmission-supporting frames to the main frame permits the main chassis frame to twist more or less in passing over obstructions without putting any injurious strain on either of the auxiliary frames.

25 is the lever by which the transmission gearing is shifted to secure the different speeds. This lever is pivoted to the motor-supporting frame at 26 and extends up through the usual H-slot formed in a frame 28 that is supported by the main chassis frame. The H-slot has associated therewith a slide 27 which is connected by rods 30 with actuators 31 that lead to the transmission gearing, and by which said gearing is shifted to secure the desired change of speed. It will be seen that the lever 25 and its associated parts are mounted partly on the transmission frame and partly on the main chassis frame.

My improved running gear is flexible and is especially adapted for large heavy trucks.

I have shown herein one embodiment only of my invention and have not attempted to show the various ways in which it might be embodied.

Having fully described my invention, what I claim as new and desire to secure by Letters Patent is:—

1. In a running gear for automobiles, the combination with a main frame having a cross bar, of a motor-sustaining frame situated at one side of the cross bar and pivotally connected thereto at one end, the other end of said motor-sustaining frame being rigidly connected to the main frame, and a transmission-sustaining frame independent from the motor-sustaining frame situated on the opposite side of the cross bar and pivotally connected at one end thereto, the other end of said transmission-sustaining frame being rigidly connected to the main frame.

2. In an automobile, the combination with a main frame, of a transmission-sustaining frame flexibly connected thereto, an independent motor-sustaining frame also flexibly connected to the main frame, an actuator for adjusting the gears of the transmission carried by the transmission-sustaining frame, and a controlling lever therefor pivoted to the motor-sustaining frame.

3. In an automobile, the combination with a main frame, of a transmission-sustaining frame flexibly connected thereto, an independent motor-sustaining frame also flexibly connected to the main frame, an actuator for adjusting the gears of the transmission carried by the transmission-sustaining frame, a slide connected to said actuator and sustained by the main chassis frame, and a lever operated by said slide and pivoted to the motor-sustaining frame.

4. In an automobile, the combination with a main frame, of a transmission-sustaining frame flexibly connected to the main frame, an independent motor-sustaining frame also flexibly connected to the main frame, a main driving clutch sustained by the motor-sustaining frame, an actuator for said clutch also carried by said frame, an actuator for adjusting the gears of the transmission carried by the transmission-sustaining frame, a controlling lever, a slide actuated by said lever and connected to said latter actuator, said slide being sustained by the main frame.

5. In an automobile, the combination with a main frame, of a transmission-sustaining frame flexibly connected to the main frame, an independent motor-sustaining frame also flexibly connected to the main frame, a main driving clutch sustained by the motor-sustaining frame, an actuator for said clutch also carried by said frame, an actuator for adjusting the gears of the transmission carried by the transmission-sustaining frame, a slide sustained by the main frame and operatively connected to said latter actuator, and a controlling lever pivotally connected to the motor-sustaining frame and adapted to actuate said slide.

6. In a running gear for automobiles, the combination with a main frame having a cross bar, of a motor-sustaining frame, situated on one side of the cross bar and comprising two side sills which are rigidly connected at one end to the main frame and are connected at the other end by a yoke which is pivoted to the cross bar, and a transmission-sustaining frame situated on the opposite side of the cross bar and comprising two side sills that are separate from the main frame but are rigidly connected at one end thereto and are connected at their opposite ends by a yoke which is also pivoted to the cross bar of the main frame.

In testimony whereof, I have signed my name to this specification, in the presence of two subscribing witnesses.

JOHN ECKHARD.

Witnesses:
Louis C. Smith,
Thomas J. Drummond.